United States Patent [19]
Raleigh

[11] Patent Number: 5,642,724
[45] Date of Patent: Jul. 1, 1997

[54] FLUID MIXING SYSTEMS AND GAS-FIRED WATER HEATER

[75] Inventor: William F. Raleigh, Santa Clarita, Calif.

[73] Assignee: Teledyne Industries, Inc., Los Angeles, Calif.

[21] Appl. No.: 313,090

[22] PCT Filed: Nov. 29, 1993

[86] PCT No.: PCT/US93/11500

§ 371 Date: Sep. 29, 1994

§ 102(e) Date: Sep. 29, 1994

[87] PCT Pub. No.: WO95/14889

PCT Pub. Date: Jun. 1, 1995

[51] Int. Cl.$^6$ ............................................. F24H 1/00
[52] U.S. Cl. ................. 126/350 R; 126/361; 431/354; 431/90; 137/505.14; 137/100; 48/180.1
[58] Field of Search .................. 431/90, 354; 48/180.1; 126/350 R, 361; 122/17, 248, 165; 137/505.14, 100

[56] References Cited

U.S. PATENT DOCUMENTS

| | | |
|---|---|---|
| 1,509,782 | 9/1924 | Samuelson . |
| 1,574,107 | 2/1926 | Peters .................................. 431/90 |
| 2,366,322 | 1/1945 | Foster .................................. 48/180 |
| 2,658,742 | 11/1953 | Suter et al. ............................ 431/328 |
| 2,751,974 | 6/1956 | Stadler ................................. 158/118 |
| 2,799,288 | 7/1957 | Knight .................................. 431/90 |
| 2,992,084 | 7/1961 | Schropp ................................ 48/180 |
| 3,173,470 | 3/1965 | Wright .................................. 158/99 |

(List continued on next page.)

FOREIGN PATENT DOCUMENTS

| | | |
|---|---|---|
| 0157432 | 10/1985 | European Pat. Off. . |
| 395695 | 8/1973 | U.S.S.R. . |
| 430678 | 6/1935 | United Kingdom .................. 431/354 |
| WO9318342 | 9/1993 | WIPO . |

OTHER PUBLICATIONS

High Efficiency Hydronic Heating Unit, Gas Research Institute, Jan. 1987. Forty two pages.

Technology Profile, Gas Research Institute, Oct. 1985. Two pages.

*Primary Examiner*—Carroll B. Dority
*Attorney, Agent, or Firm*—Benoit Law Corporation

[57] ABSTRACT

The disclosed methods and apparatus for mixing a secondary fluid with a primary fluid have utility in venturi and other fluid mixing systems in agriculture, fluid, fuel combustion and other fields where liquid or gaseous chemicals, liquid or gaseous fuels or other fluids are entrained in a stream of water, air or other gaseous or liquid primary fluid. One of these methods provides for the primary fluid (21) a first flow channel (65) deceasing in a direction of flow of primary fluid, utilizes dynamic energy of that primary fluid to induce secondary fluid (35) into that primary fluid, and provides for the primary fluid with induced secondary fluid a second flow channel (66) increasing in a direction of flow of that primary fluid with induced secondary fluid, while arranging corresponding sides 67 and 68 of these first and second flow channels along a plane common to said first and second channels. Another method or apparatus that may be combined with the method or apparatus just described, or that may be employed separately, tracks the primary fluid in pressure with the secondary fluid at a negative pressure offset relative to a pressure that would produce a substantially constant ratio of secondary fluid to primary fluid (94, FIG. 3), meters that secondary fluid (101), and distributes such metered secondary fluid across a flow of the primary fluid (79, 92).

Methods and apparatus providing a gas-fired heater (10) tilt a combustion chamber (23) and heat exchanger assembly (14) relative to ground so that substantially all condensate and scale (19) falling from the heat exchanger misses the gas burner (16).

59 Claims, 4 Drawing Sheets

U.S. PATENT DOCUMENTS

| | | | |
|---|---|---|---|
| 3,292,598 | 12/1966 | Miller et al. | 122/406 |
| 3,630,175 | 12/1971 | Reid et al. | 122/250 |
| 3,734,065 | 5/1973 | Reid et al. | 122/250 |
| 4,123,800 | 10/1978 | Mazzei | 366/150 |
| 4,270,896 | 6/1981 | Polinski et al. | 431/328 |
| 4,318,392 | 3/1982 | Schreiber et al. | 126/110 |
| 4,332,547 | 6/1982 | MacDonald, Jr. | 431/329 |
| 4,385,887 | 5/1983 | Yamamoto et al. | 431/90 |
| 4,499,890 | 2/1985 | Meulenbrug | 431/354 |
| 4,597,734 | 7/1986 | McCausland et al. | 431/328 |
| 4,643,667 | 2/1987 | Fleming | 431/7 |
| 4,653,466 | 3/1987 | DeHaan et al. | 126/110 |
| 4,725,223 | 2/1988 | Coppin et al. | 431/243 |
| 4,768,947 | 9/1988 | Adachi | 431/90 |
| 4,784,218 | 11/1988 | Holl | 165/109 |
| 4,810,587 | 3/1989 | Losfeld et al. | 428/549 |
| 4,850,862 | 7/1989 | Bjerklie | 432/182 |
| 4,861,261 | 8/1989 | Krieger | 431/1 |
| 4,878,837 | 11/1989 | Otto | 431/328 |
| 4,890,601 | 1/1990 | Potter | 126/512 |
| 4,895,513 | 1/1990 | Subherwal | 431/328 |
| 4,919,609 | 4/1990 | Sarkisian et al. | 431/7 |
| 4,957,160 | 9/1990 | Raleigh | 165/160 |
| 4,977,111 | 12/1990 | Tong et al. | 501/95 |
| 4,983,467 | 1/1991 | De Bruyne et al. | 428/605 |
| 5,036,829 | 8/1991 | Woo | 126/113 |
| 5,060,629 | 10/1991 | Sirand | 126/92 |
| 5,076,781 | 12/1991 | Cremers | 431/75 |
| 5,088,919 | 2/1992 | De Bruyne et al. | 431/328 |
| 5,112,217 | 5/1992 | Ripka et al. | 431/12 |
| 5,183,401 | 2/1993 | Dalla Betta et al. | 431/328 |
| 5,205,731 | 4/1993 | Reuther et al. | 431/328 |
| 5,211,552 | 5/1993 | Krill et al. | 431/7 |
| 5,317,992 | 6/1994 | Joyce | 122/14 |
| 5,340,305 | 8/1994 | Joyce | 431/7 |
| 5,347,980 | 9/1994 | Shellenberg | 126/110 |
| 5,380,192 | 1/1995 | Hamos | 431/7 |
| 5,520,533 | 5/1996 | Vrolijk | 431/90 |

FLUID MIXING SYSTEMS AND GAS-FIRED WATER HEATER

DESCRIPTION

1. Technical Field

The subject inventions relate to methods and apparatus for mixing secondary fluids with primary fluids, to venturi systems, to methods of making venturi systems, to gas-fired heaters, and to combinations thereof.

2. Background

Venturi and other fluid mixing system and their utility are well known in various fields.

It is an object of the invention to provide improved venturi and other fluid mixing systems for use in agriculture, fluid fuel combustion and other fields where liquid or gaseous chemicals, liquid or gaseous fuels or other fluids are entrained in a stream of water, air or other gaseous or liquid primary fluid.

Another object of the invention is to incorporate improved venturi or other fluid mixing systems for combustible gas and air into gas-fired water and other heaters.

Gas-fired water and other heaters and their utility are well known, and it is another object of the invention to provide improved gas-fired water and other heaters and heating systems.

DISCLOSURE OF INVENTIONS

According to one aspect thereof, the invention resides in methods of mixing a secondary fluid with a primary fluid, and more specifically resides in the improvement comprising in combination, providing for the primary fluid a first flow channel deceasing in a direction of flow of primary fluid, utilizing dynamic energy of that primary fluid to induce the secondary fluid into that primary fluid, providing for the primary fluid with induced secondary fluid a second flow channel increasing in a direction of flow of that primary fluid with induced secondary fluid, and arranging corresponding sides of the first and second flow channels along a plane common to these first and second channels.

From a related aspect thereof, the invention resides in apparatus for mixing a secondary fluid with a primary fluid by utilizing dynamic energy of that primary fluid to induce the secondary fluid into such primary fluid, and more specifically resides in the improvement comprising, in combination, a first flow channel for the primary fluid deceasing in a direction of flow of primary fluid, a second flow channel for the primary fluid with induced secondary fluid increasing in a direction of flow of that primary fluid with induced secondary fluid, and an inlet of the secondary fluid to the primary fluid between these first and second flow channels, with corresponding sides of these first and second flow channels lying in a plane common to these first and second channels.

From a related aspect thereof, the invention resides in a method of mixing a secondary fluid with a primary fluid, and more specifically resides in the improvement comprising, in combination, tracking the primary fluid in pressure with the secondary fluid at a negative pressure offset relative to a pressure that would produce a substantially constant ratio of secondary fluid to primary fluid, metering that secondary fluid, and distributing that metered secondary fluid across a flow of the primary fluid.

From a related aspect thereof, the invention resides in apparatus for mixing a secondary fluid with a primary fluid, and more specifically resides in the improvement comprising, in combination, a zero governor type of secondary fluid regulator having a negative pressure offset, a secondary fluid metering device connected to that governor, and a secondary fluid distributor connected to that metering device.

The invention resides also in combinations of these mixing methods and in combinations of these mixing apparatus.

Another invention herein disclosed resides in a method of constructing and operating a gas-fired heater having a gas burner, combustion chamber and heat exchanger assembly for heating fluid in the heat exchanger by combustion of an air/gas mixture, with the gas burner located closer to ground than the heat exchanger which can produce condensate and scale falling toward ground. The invention according to this aspect resides more specifically in the improvement comprising, in combination, tilting the combustion chamber and heat exchanger assembly relative to ground so that substantially all condensate and scale falling from the heat exchanger misses the gas burner, providing the air/gas mixture with substantially all the air needed for a combustion, and force-feeding that air/gas mixture with substantially all the air to the gas burner for combustion thereof.

From a related aspect thereof, the invention resides in a gas-fired heater, and more specifically in the improvement comprising, in combination, a gas burner, combustion chamber and heat exchanger assembly tilted relative to ground so that the gas burner is closer to ground than the heat exchanger and so that the gas burner is on one side of a plane extending vertically to ground, and the heat exchanger is on the opposite side of that plane, and an air/gas mixture force-feeder for combustible air/gas mixtures connected to the combustion chamber and having a capacity for supplying to the combustible air/gas mixture for the gas burner substantially all the air needed for combustion without substantial secondary air.

From a related aspect thereof, the invention resides in combinations of either or both fluid mixing methods or fluid mixing apparatus with the latter method of constructing and operating a gas-fired heater or with the latter gas-fired heater.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or equivalent parts, and in which.

DESCRIPTION OF PREFERRED EMBODIMENTS

Figure 1:
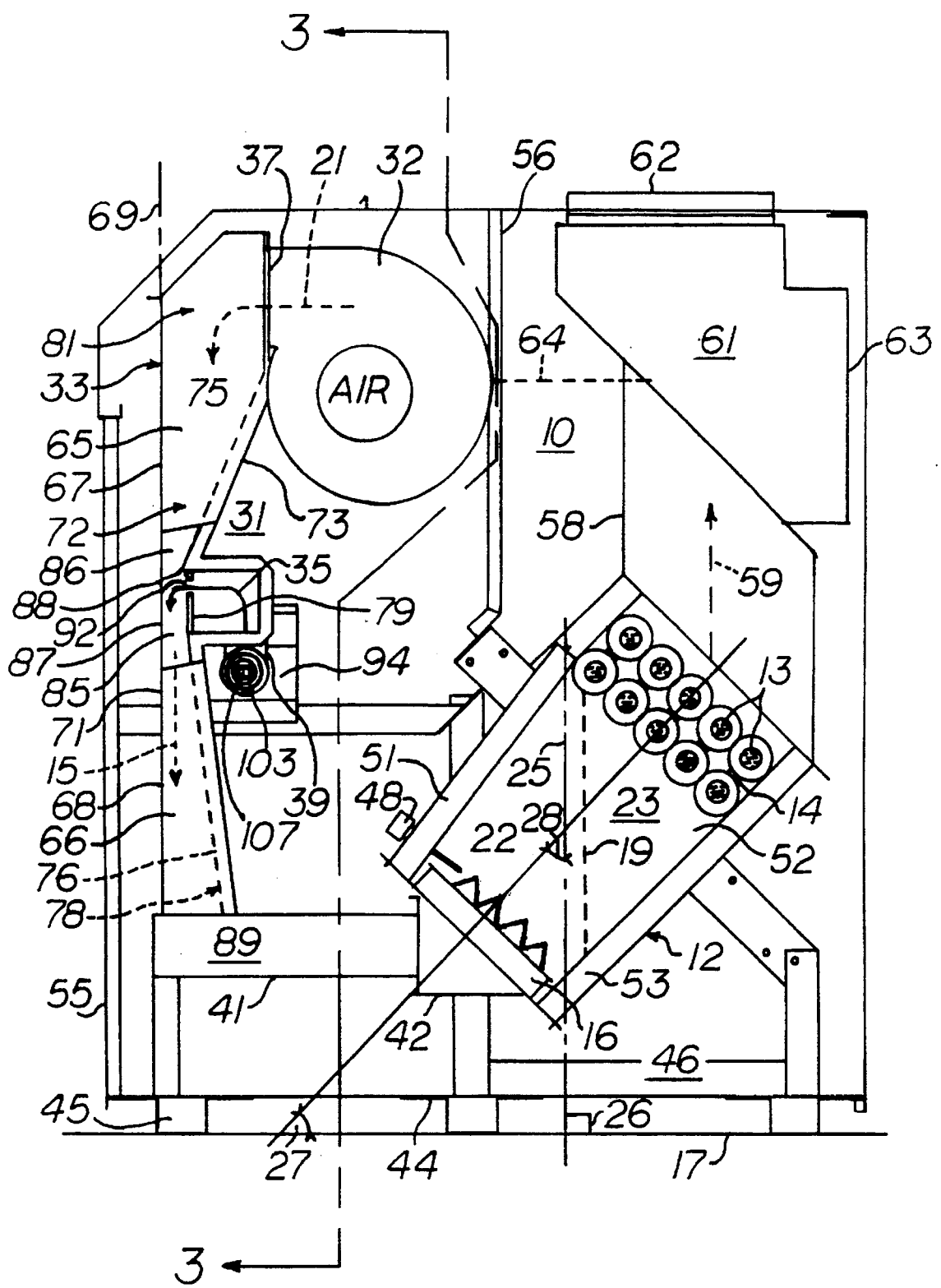
FIG. 1 is a side view, partially in section, of a fuel combustion apparatus according to an embodiment the invention, and of a venturi system pursuant to a preferred embodiment of the invention.

The accompanying drawings illustrate a method of constructing and operating a gas-fired heater, as well as a gas-fired heater 10 having a combustion chamber and heat exchanger assembly 12 for heating fluid 13 in the heat exchanger 14 by combustion of an air/gas mixture 15, with the gas burner 16 located closer to ground 17 than the heat exchanger 14. In operation, the heat exchanger may produce condensate and occasionally scale falling toward ground, as indicated by the dotted line 19 in FIG. 1. Condensate falling on the burner can cause corrosion or generally damage the surface. Scale falling on the burner can block the burner surface, changing its effective area or flame characteristics.

The currently disclosed aspect of the invention tilts the combustion chamber and heat exchanger assembly 12 relative to ground 17 so that substantially all condensate and scale 19 falling from the heat exchanger 14 misses the gas burner 16. Also, by tilting the assembly 12 the burner 16 can easily be removed from or mounted to the combustion chamber 23 for service or replacement. This also facilitates removal of fallen scale or other contaminants 19 from the area of a side wall 53, as may be occasionally required.

In combination with the tilting of the combustion chamber and heat exchanger assembly 12, the invention provides the air/gas mixture 15 with substantially all the air 21 needed for combustion without any substantial secondary air, and force-feeds that air/gas mixture 15 with substantially all that air to the gas burner 16 for combustion thereof, illustrated in FIG. 1 by cones representing red flames 22. Secondary air combustion is avoided in the practice of the invention.

In this respect, without sufficient primary air in the air/gas mixture 15, free-flame combustion has to rely on secondary air, drawn to the flame, in addition to the primary air contained in the air/gas mixture fed to the flame. This in practice can produce combustion products containing high amounts of pollutants, such as nitrous oxides often abbreviated as $NO_f$.

On the other hand, combustion of an air/gas mixture initially supplied with 100% primary air or with substantially all the air needed for combustion, such as herein disclosed, produces short flames 22 in the range of a few inches (less than 10–15 centimeters), as opposed to the one foot or thirty centimeter high flames in many conventional gas-fired boilers.

Accordingly, avoidance of such long flames at the burner 16, or radiant burner operation, permits tilting of the combustion chamber and heat exchanger assembly 12 according to the subject invention, while such tilting assures that any condensate and scale drippings 19 from the heat exchanger 14 miss the gas burner 16, thereby minimizing burner contamination and thereby further minimizing air pollution from the gas combustion at the burner.

It is thus seen that the features of the invention are interactive in practice.

The combustion chamber and heat exchanger assembly 12 as shown in FIG. 1 is provided with a combustion chamber 23 between the gas burner 16 and the heat exchanger 14 and the combustion chamber and heat exchanger assembly 12 is tilted so that a diagonal 25 through that combustion chamber 23 extends substantially at right angles to ground 17, as indicated at 26.

The reference numeral 25 designates either the diagonal line or plane through the combustion chamber 23 just mentioned, or designates a vertical line or plane in general. In this respect, the combustion chamber and heat exchanger assembly according to another aspect of the invention, is tilted relative to ground 17, so that the gas burner 16 again is closer to that ground than the heat exchanger 14, and so that the gas burner 16 is on one side of the plane 25 extending vertically to ground, and the heat exchanger 14 is on the opposite side of that plane 25. In FIG. 1 the burner 16 is on the left side of the vertical plane 25 and the heat exchanger 14 is on the opposite right side of that plane, but is could be the other way around within the scope of the invention.

In the preferred embodiment shown in FIG. 1, the combustion chamber and heat exchanger assembly 12 is tilted at substantially forty-five degrees relative to ground 17 as indicated by the angle 27 or relative to the vertical 25 as indicated by the angle 28.

Porous type of burners are preferred for the gas burner 16. Reference may in this respect be had to U.S. Pat. No. 5,205,731, by J. J. Reuther et al, issued Apr. 27, 1993 to Battelle Memorial Institute, for "Nested-Fiber Gas Burner," and herewith incorporated by reference herein and to European Patent Application 0 157 432, entitled "Radiant surface combustion burner," by Shell International Research Maatschappij B.V., inventors: D. A. C. McCausland et al, published 9 Oct. 1985. In addition to the non-woven or nested fiber burners shown in the European application and in the cited Battelle patent, burners with which the subject invention may be practiced include the porous burners disclosed in U.S. Pat. No. 3,173,470 by J. S. Wright, issued Mar. 16, 1965 for Gas-Fueled Radiant Heater, U.S. Pat. No. 4,850,862, by John W. Bjerklie, issued Jul. 25, 1989 for Porous Body Combustor/Regenerator, U.S. Pat. No. 4,878,837, by Nancy M. Otto, issued Nov. 7, 1989 for Infrared Burner, U.S. Pat. No. 4,895,513, by Bodh R. Subherwal, issued Jan. 23, 1990 for Heat Resistant Combustion Element, U.S. Pat. No. 4,977,111, by Timothy W. Tong et al, issued Dec. 11, 1990 for Porous Radiant Burners Having Increased Radiant Output, and U.S. Pat. No. 5,088,919, by Roger De Bruyne et al, issued Feb. 18, 1992 for Burner Membrane.

The air/gas mixture 15 with substantially all needed primary air 21 is force-fed to the porous burner 16 for combustion 22 thereat. In this respect, FIG. 1 shows an air/gas mixture force-feeder 31 for combustible air/gas mixtures connected to the gas burner 16 and having a capacity for supplying to that combustible air/gas mixture 15 for the gas burner 16 substantially all the air 21 needed for combustion.

Figure 2:
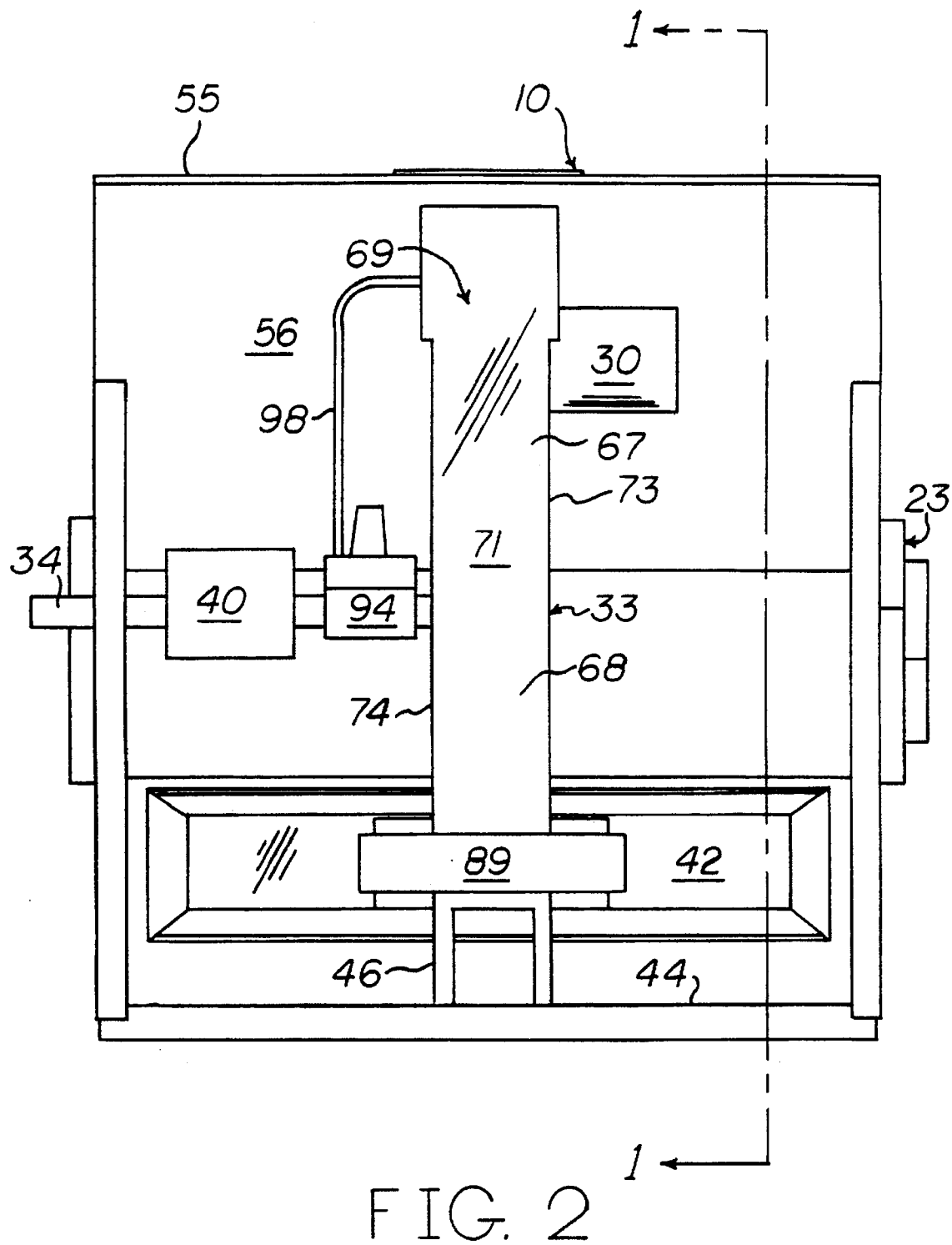
FIG. 2 is a rear view of the apparatus with venturi system shown in FIG. 1, with FIG. 1 being a section taken on the line 1—1 in FIG. 2.
Figure 3:
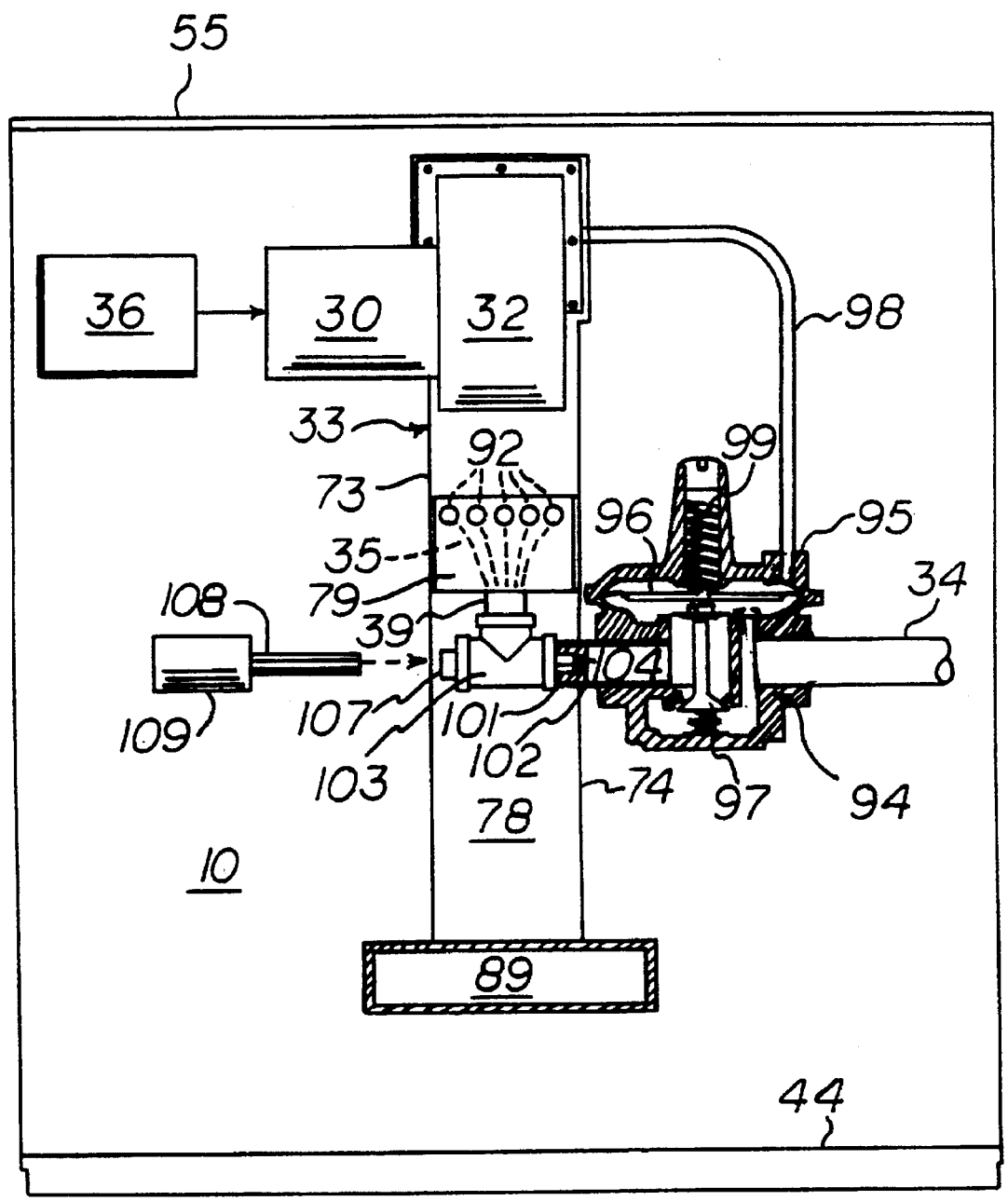
FIG. 3 is a view partially in section and taken on the line 3—3 in FIG. 1.

As seen in FIGS. 1 to 3, the air/gas mixture force-feeder 31 includes a blower 32 having a capacity for supplying to the gas burner 16 an air/gas mixture 15 including substantially all the air for combustion. In this respect, the capacity or performance of the blower 32 may be regulated, until the desired kind of combustion takes place at the porous burner 16.

As also shown in FIGS. 1 to 3, the air/gas mixture force-feeder 31 may include a venturi system 33. Pursuant to the illustrated embodiment of the invention, the air/gas mixture force-feeder 31 includes a blower 32 connected to the venturi system 33.

FIG. 2 shows a source of gas such as a supply line 34, and the invention may be practiced with all kinds of combustible gases, including butane gas, propane gas, natural gas, and other gaseous fuels. The air 21 is forced-fed and combusted with such butane, propane, natural or other gaseous fuels 35 so that the flames 22 burn without a need for secondary air.

Figure 4:
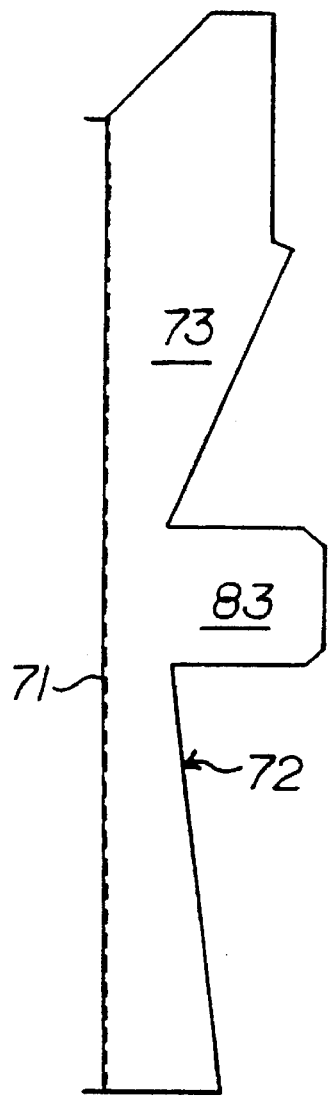
FIGS. 4 and 5 are, respectively, a side view and a top view of a substantially U-shaped wrap used in the venturi system of FIGS. 1 to 3 according to a preferred embodiment of the invention.

Venturi-type and blower air/gas mixing systems with radiant fiber matrix burners have been known before, as may be seen from the Final Report, January 1987, entitled *High Efficiency Hydronic Heating Unit*, Gas Research Institute, FIG. 4, etc. (see also *Gas Research Institute TECHNOLOGY PROFILE*, October 1985).

Mixing systems other than the one shown in FIGS. 1 to 3 may be employed within the scope of the invention, but the system shown in FIGS. 1 to 3 makes for a particularly intimate air/gas admixture.

The force-feeder 31 according to a preferred embodiment of the invention includes a blower 32 adapted to provide substantially all the air for the combustible air/gas mixture, and apparatus for entraining gas 35 into substantially all that air 21 provided by that blower. This is contrary to conventional systems in which the air and gas are mixed by a fan or blower. In that case, the blower must handle a combustible mixture of gas and air (oxygen) and therefore must be of special construction, being very expensive and tending to be heavy or bulky.

The force-feeder 31 or venturi 33 is arranged in a downward-flow orientation from an air input 37 to an air/gas mixture output 89, and may be arranged vertically relative to ground 17. In practice, this positions the air blower 32 in a convenient, serviceable position and uses space efficiently. In this manner, the force-feeder or venturi system does not engender the height and width requirements and design limitation imposed on prior-art heating appliances with horizontally extending venturi systems.

Also, air and air/gas mixture this way flow in a convenient circuit with low impedance, being substantially "counter-clockwise" from blower 32 through venturi 33 to burner 16 or at any rate in the same sense of progression, being either "clockwise" or "counterclockwise" so to speak.

The positive-side venturi system 33 according to an embodiment of the invention allows use of an inexpensive fan or blower 32 to move combustion air 21 for the required formation of the air/gas mixture 15. Such venturi system also allows control of the energy input rate by simply changing the air flow rate. Input rate changes are accomplished at essentially constant fuel/air ratio, and most simply by changing the speed of the blower 32.

The blower 32 includes an electric drive motor 30. Blower speed can be controlled by using a multiple speed motor, or with an electrical or electronic motor speed control 36, such as indicated in FIG. 3. Changes can be discreet, such as step change from full to half speed, or continuous/proportional, in response to a controlled variable such as water temperature.

The force-feeder 31 includes a venturi system 33 having an air input 37 for substantially all the air, an air/gas mixture output 38 connected to the gas burner 16 for blue-flame combustion 22, and a gas input 39 between the air input and air/gas mixture output.

The force-feeder 31 further includes the air blower 32 connected to the air input 37 of the venturi system and adapted to force-feed substantially all the air 21 into that air input of the venturi system 33.

The gas 35 applied from the source or inlet 34 through the gas input 39 is entrained with the venturi system 33 into the flow of air 21 to provide an air/gas mixture 15. Such an air/gas mixture is applied to the gas burner 16, such as via a duct 41 and burner plenum 42.

A gas valve or control 40 also may be and typically is provided for shutting the gas 35 on and off and for other desired functions. That may include a gas pressure regulator or regulator system, such as the negative pressure regulator and gas valve system shown in the above mentioned Final Report (January 1987) or the more advanced regulation and gas distribution, preferably with metering, herein disclosed.

The heater 10 has a base 44 with legs 45 standing on a concrete floor or other firm ground 17. The burner/heat exchanger assembly 12, air/gas mixture force-feeder assembly 31, and other components of the heater 10 preferably are mounted on or supported by the heater base 44 in any effective and convenient manner, and brackets or supports 46 are shown in this respect.

The burner 16 preferably is attached to the bottom of the combustion chamber such that essentially only its upper frame and burner face are within the combustion chamber 23 and exposed to the high temperature therein. Furthermore, the burner is cooled from within by flow of the air/gas mixture 15. This design and the above mentioned control of the flame characteristics, assure that the burner does not get too hot.

The illustrated combustion chamber 23 is small so that there is minimum heat loss and a minimum of heat storage (residual heat). With blue-flame combustion, the combustion chamber height and depth may be as small as a few inches.

An igniter 48 is diagrammatically indicated for igniting the air/gas mixture 15 at the burner 16. Hot surface or spark ignition may be used where a pilot light would be unacceptable.

The combustion chamber 23 may at least partially be defined by four walls of refractory material, three of which are seen in FIG. 1 at 51, 52 and 53, and the fourth or front-most of which has been omitted to show the inside of the combustion chamber 23.

By way of example, alumina-silica insulation board may be used at 51, 52, etc. as the combustion chamber refractory material and insulation. This material is lightweight and has excellent resistance to heat flow.

The heat exchanger 14 may, for instance, be of a conventional kind with finned tubes for the liquid or fluid. 13 in any desired series or parallel/series configuration or arrangement. Baffles may be used at the finned tubes as desired. Reference may be had to U.S. Pat. No. 4,957,160, by William F. Raleigh, issued Sep. 18, 1990 for Self-Clamping Baffle For Tubular Structures, and to U.S. Pat. No. 5,163,508, by Robert E. Hamos, issued Nov. 17, 1992 for Heat Exchanger Baffle System; which patents are herewith incorporated by reference herein.

The illustrated heating appliance 10 includes a housing shown rather diagrammatically at 55, as it may be conventional. A partition wall 56 may be provided to keep the force-feeder train 31 cool.

The heating appliance 10 has a collector 58 for the flue products 59 above the heat exchanger 14. The heating appliance also has a top structure 61 which gathers the collected flue products 59 for exhaust through the more convenient one of two vents 62 or 63, with or without vent stack or chimney vents. The blower 32 for the inlet air 21 may also be used for assisting the exhaust of the combustion products 59 in any desired manner, symbolically indicated by a dotted line 64 between the blower 32 and the exhaust top 61. By way of example, within the scope of the invention, the blower 32 may be removed from the venturi inlet 80 and may be replaced at 61, 62 or 63 with an exhaust fan or blower that pulls in air through the venturi system at 80 by pulling away the combustion products or exhaust fumes 59. In such an induced draft system, the induced air and gas mixture in effect would still be force-fed to the burner 16 by the pull of the exhaust fan on the exhaust products.

The accompanying drawings also illustrate methods and apparatus for mixing combustible gas or another secondary fluid with air or another primary fluid according to a further aspect of the invention that may, for instance, be employed in the embodiment of FIGS. 1 to 3, but whose application and utility obviously are much wider than that. Indeed, there is a continuing need for better venturi and other fluid mixing systems in agriculture, fluid fuel combustion and other fields where liquid or gaseous chemicals, liquid or gaseous fuels or other fluids are entrained in a stream of water, air or other gaseous or liquid primary fluid.

In this respect and in general, this aspect of the invention provides for the air or other primary fluid 21 or for the venturi 33 a first flow channel 65 deceasing in the direction of flow of primary fluid 21. This aspect of the invention utilizes dynamic energy of the primary fluid 21 to induce the gas or other secondary fluid 35 into that primary fluid, such as via an inlet of the secondary fluid 35 to the primary fluid 21 between the first and second flow channels, and provides for such primary fluid with induced secondary fluid a second flow channel 66 increasing in the direction of flow of the primary fluid with induced secondary fluid. According to that aspect of the invention, corresponding sides 67/68 of the first and second flow channels 65 and 66 are arranged along a plane 69 common to such first and second channels; being the plane of the paper or parallel to the plane of the paper in FIG. 2.

A preferred embodiment of the invention provides a flat sheet metal or other piece of material 71 in that common plane 69 and forms the corresponding sides 67 and 68 of the first and second flow channels 65 and 66 of that flat piece of material in one piece. In this or any other manner, corresponding sides of the first and second flow channels 65 and 66 comprise a flat piece of material 71 extending in a common plane.

As seen in the drawings, the first flow channel 65 is or is made to be of rectangular cross-section decreasing in the direction of flow of the primary fluid 21, and the second flow channel 66 is or is made to be of rectangular cross-section increasing in the direction of flow of the primary fluid 21 with induced secondary fluid 35. In this or any other manner, the first flow channel 65 includes the flat piece of material 71 in a flow channel of rectangular cross-section deceasing in the direction of flow of the primary fluid 21, and the second flow channel 66 includes that flat piece of material 71 in a flow channel of rectangular cross-section decreasing in the direction of flow of the primary fluid with induced secondary fluid 21 and 35.

According to the illustrated preferred embodiment of the invention, corresponding sides of rectangular cross-sections of the first and second fluid channels 65 and 66 are arranged or extend along the plane 69 common to the first and second channels 65 and 66.

This concept is expanded according to a further embodiment of the invention by providing a flat piece of material 71 extending in the common plane 69, forming the first flow channel 65 with the aid of that flat piece of material into a flow channel of rectangular cross-section deceasing in the direction of flow of the primary fluid 21, and forming the second flow channel 66 with the aid of that flat piece of material into a flow channel of rectangular cross-section decreasing in the direction of flow of the primary fluid 21 with induced secondary fluid 35.

Figure 5:
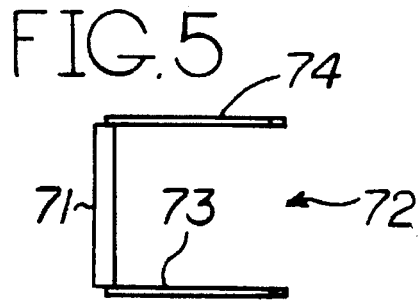

In fact, pursuant to a preferred embodiment of the invention, formation of the first and second flow channels 65 and 66 includes provision of a piece of material of U-shaped cross-section 72 as seen in FIGS. 4 and 5, having the above mentioned flat piece of material 71 as a flat bight portion and having first and second sides 73 and 74, with such first side 73 forming corresponding first sides of (a) the first flow channel 65 decreasing in the direction of flow of said primary fluid 21 and of (b) the second flow channel 66 increasing in the direction of flow of the primary fluid 21 with induced secondary fluid 35; such corresponding sides being the sides of the first and second flow channels 65 and 66 facing the observer of FIG. 1; and with the second side 74 of the U-shaped cross-section 72 forming corresponding opposite second sides of (c) the decreasing first flow channel 65 and (d) of the increasing second flow channel 66; such corresponding opposite second sides being the sides of the first and second fluid channels 65 and 66 along 74 in FIGS. 2 and 3.

In structural terms, a piece of material 72 of U-shaped cross-section has a flat bight portion 71 and has first and second sides 73 and 74 included, respectively, in corresponding first sides of (i) a first flow channel 65 decreasing in the direction of flow of the primary fluid 21 and of (ii) a second flow channel 66 increasing in the direction of flow of said primary fluid with induced secondary fluid 21 and 35, and included in corresponding opposite second sides of (iii) the decreasing first flow channel 65 and of (iv) the increasing second flow channel 66.

Figure 6:
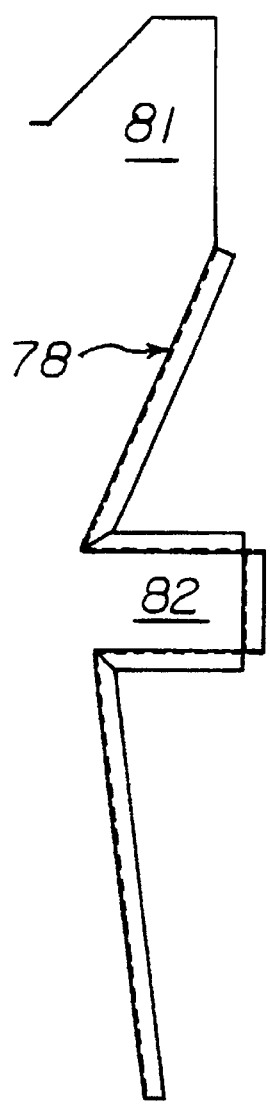
FIGS. 6 and 7 are, respectively, a side view and rear view of a sweep sheet complementing the U-shaped wrap of FIGS. 4 and 5 in the manufacture of the venturi system according to a preferred embodiment of the invention.
Figure 7:
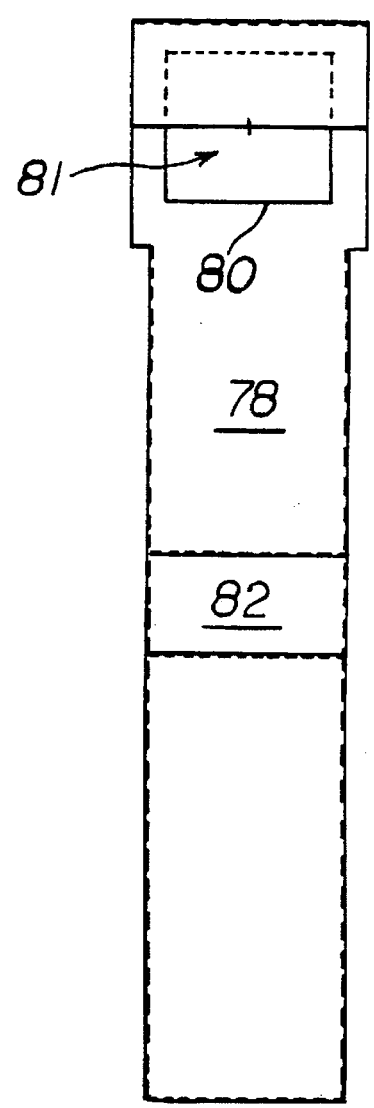

A closure of further sides of these first and second flow channels is opposite the flat bight portion. By ways of example, further sides of the first and second flow channels 65 and 66 opposite the flat bight portion 71 are also closed with one or more bent of flat sheets of material, such as shown by dotted lines 75 and 76 that also indicate seams along which the sheets forming the venturi structure 33 may be welded, soldered, riveted, cramped or otherwise interconnected in a manner forming tight seals all along. Peripheral dotted lines in FIGS. 4, 6 and 7 show possible fold lines.

When viewing the illustrated embodiments, it may be recalled that prior-art venturi systems shaped each venturi inlet and each venturi outlet channel symmetrically about an axis extending in the direction of primary and mixed primary/second fluid flow. Contrary to such prior-art tradition, the illustrated preferred embodiment of the invention creates an asymmetrical or non-symmetrical configuration of the first and second flow channels 65 and 66 relative to the plane 69. In practice, this has several manufacturing, design, and functional advantages.

For instance, by making the venturi non-symmetrical, the illustrated preferred embodiment of the invention allows a single piece of material 71 to provide an entire side of the venturi. According to a further embodiment, a single piece of easily bent sheet metal 72 may provide three sides of the venturi, such as seen in FIGS. 1 to 5. In fact, the complete venturi structure 33 may be formed of only three pieces of sheet metal. They are the three-sided wrap 72 seen in FIGS. 1, 2, 4 and 5, a sweep sheet 78 seen in FIGS. 3, 6 and 7 and forming the closures 75 and 76 shown in FIG. 1, and a distributor plate 79 seen in FIGS. 1 and 3. The sweep sheet may cover the U-shaped cross-section opposite the center portion 71, called "bight portion" in allusion to the U-shape of the wrap 72 seen in FIG. 5, for instance.

In practice, the sweep sheet may provide a primary fluid inlet opening 80 for the venturi system 33 or an opening 80 for the outlet of blower 32 and helps forming the inlet plenum 81 for the air or other primary fluid 21. The sweep sheet 78 also provides a secondary fluid inlet at 39 and three sides of a gas plenum 82 laterally completed by corresponding projections 83 of the U-shaped wrap 72.

The distributor plate 79 may be a sheet metal piece having holes 91 through which gas or other secondary fluid 35 flows into the throat 87 of the venturi for mixing with air or other primary fluid 21.

The non-symmetrical design according to a preferred embodiment also facilitates spatial layout of the fan-venturi-burner system. To minimize system length, the fan or blower 32 may be placed to one side of a plenum 81 at the venturi mouth, and air flow turns 90° to enter the plenum. In the asymmetrical design, the inlet portion of the sweep sheet is displaced toward the blower to receive this turning flow. The result is a less severe flow path. Likewise, air/gas mixture flow turns in the direction of the outlet portion of the sweep sheet as it leaves the venturi. In both cases, space is conserved and static pressure losses are reduced. Reduction of losses, of course, reduces the blower power requirement, the blower cost and the operating costs.

Such blower cost is further reduced by entraining the gas or secondary fluid 35 only after the air or primary fluid flow 21 has been generated, whereby an inexpensive fan or blower 32 can be used, instead of the expensive, explosion-proof or chemically resistant blowers needed in prior-art systems where air and gas or primary and secondary fluids were mixed ahead of the blower inlet.

In the venturi system 33 the pressure of the primary fluid 21 decreases in the first flow channel 65 while its velocity increases for entrainment of the secondary fluid 35 therein. Conversely, the pressure of the primary fluid/secondary fluid or air/gas mixture 15 increases while its velocity decreases in the second flow channel 66.

Pursuant to a preferred embodiment of the invention, that second flow channel 66 is given a smallest cross-section 85 larger than the smallest cross-section 86 of the first flow channel 65, and the venturi system 33 includes an inlet 39 ... 92 for the secondary fluid 35 into the primary fluid 21 between the smallest cross-sections of the first and second flow channels, or the secondary fluid 35 may otherwise be induced into the primary fluid 21 between such smallest cross-sections of these first and second flow channels. That area or region may be referred to as venturi throat 87.

To promote turbulence for intimate mixture, the first flow channel 65 preferably is provided with a transverse edge 88 at its smallest cross-section 86. The secondary fluid 35 is induced into the primary fluid 21 after that transverse edge in the direction of flow of said primary fluid 21. In other words, secondary fluid or gas 35 is introduced immediately after or downstream of transverse edge or step 88. Turbulent eddies, originating at that step, and general turbulence in the venturi outlet section 89 and burner 16 assure that air and gas are thoroughly mixed. The transverse edge or step 88 in the venturi throat 87 also provides a "sheltered" zone where secondary fluid or gas 35 can easily be injected.

Pursuant to an important feature of the illustrated preferred embodiment, the secondary fluid 35 is distributed at an end of the first flow channel 65 across the first and second flow channels 65 and 66. Distributor plate 79 may be provided and used for that purpose. Preferably, the holes or apertures 92 shown in the distributor plate in the vicinity of the transverse edge or step 88 at the end of the first flow channel 65 are more numerous than as shown in FIG. 3. These numerous holes 92 have relatively low pressure drop. With the shelter of the step 88, secondary fluid or gas flow is not impaired by the high-velocity primary fluid or air flow. Also, sheltering of the distribution holes 92 prevents objectional whistling in the venturi throat 87 during operation.

According to a preferred embodiment of the invention, operation of the venturi system 33 includes the tracking of primary fluid in pressure with the secondary fluid at a negative pressure offset relative to a pressure that would produce a substantially constant ratio of secondary fluid 35 to primary fluid 21. In practice this may be accomplished by appropriate adjustment of a gas pressure regulator 94 designed for zero governor service. Such "zero governor" regulators are well known and have been and are often used with venturi systems for proportioning of gas and air.

By way of example, the regulator 94 may be of the type RSZ or 210Z manufactured and sold by MAXITROL COMPANY, of Southfield, Mich., USA 48037, and D4403 Senden, Germany.

As is well known, such zero governor regulators have a reference input 95 through which the reference pressure is applied to the spring-biased diaphragm 96 of the regulator that regulates the gas flow valve 97. In this respect, FIG. 3 shows an air line 98 through which the outlet pressure of the blower 32 or the primary fluid inlet pressure of the venturi system 33 is applied to the "vent" or reference pressure inlet 95 of the regulator 94.

By way of background, a venturi system with a perfect zero regulator maintains a constant fuel/air ratio at all firing rates. This "tracking" of fuel and air is very desirable and is a significant improvement over other control approaches. Atmospheric (buoyancy driven) combustion systems, for example, operate with high excess air (i.e. very "lean" fuel/air) when energy input rate is reduced.

While the venturi's tracking of fuel and air precludes operation at undesirable fuel/air rations, this can promote adverse condensation of water from the combustion products. A heat exchanger designed for operation at full energy input rate is "oversized" at lower input rates and can cool the combustion products to temperatures near the dew point. However, a preferred embodiment of the subject invention achieves a desirable compromise between efficiency loss and condensation by programming the degree of leaning with a negative pressure regulator.

If gas pressure is maintained at a specific amount lower than the venturi inlet pressure; that is, at a negative offset, reduction in air flow will result in a gas flow reduction of greater proportion. This occurs because the negative offset is a larger portion of the inlet 81-to-throat 87 pressure difference at reduced air flow than it is at full/normal air flow. If, for example, the venturi 33 provides an inlet 81-to-throat 87 pressure difference of 690 millibar or 10 psi, and the offset is −69 millibar or −1 psi, the pressure difference across the gas metering device is 621 millibar or 9 psi. Reduction of air flow 21 to on-half will, by the familiar Bernoulli equation, reduce the inlet-to-throat air pressure difference to $10 \times (\frac{1}{2})^2$, being 2.5 psi or 172 millibar. However, the negative pressure regulator 94 still holds gas pressure at 69 millibar or 1 psi below venturi inlet pressure, so the pressure difference across the gas orifice is 2.5−1=1.5 psi or about 103 millibar. Gas flow has changed to $(1.5/9)^{1/2}=0.41$ of its original rate in response to a 0.50 change in air flow. The mixture has therefore become leaner. By deliberate choice of the venturi dimensions and flow rates and the negative pressure setting, such as by adjustment of the regulator spring 99, the degree of leaning can be controlled to a design specification for gas in air or for secondary fluid in primary fluid, for that matter.

If desired, the opposite effect could be achieved by use of a positive pressure regulator. In particular, while a perfect zero pressure regulator maintains constant fuel/air ratio or secondary fuel/primary fuel ratio, a negative pressure regulation, such as through regulator 94, will result in leaner mixtures (less fuel-to-air) when air flow is reduced and a positive pressure regulator will result in richer mixture at reduced air flow rates. This phenomenon is exploited in the venturi system 33 in a preferred embodiment.

The offset secondary fluid regulator 94 advantageously may be used in combination with secondary fluid flow metering and distribution features herein disclosed.

Figure 8:
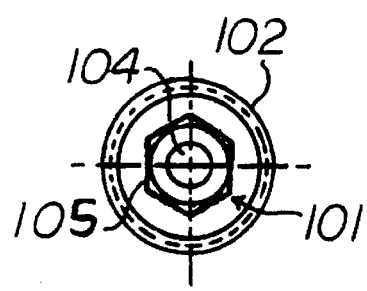
FIG. 8 is an axial view, on an enlarged scale, of a fluid flow orifice shown in section in FIG. 3.

In this respect, FIGS. 3 and 8 show an orifice element 101 threaded in the gas pipe 102 between the regulator 94 and a T-type union 103. That orifice element 101 has an external thread mating with the internally threaded gas pipe 102 and defines a central orifice 104. As best seen in FIG. 8, that orifice element also has in internal hexagonal cavity 105 downstream of the orifice 104.

During operation of the venturi structure 33, the opening of the T-type union 103 is closed by a threaded plug 107. However, that plug 107 can be removed and a hexagonal shank 108 of a tool 109 can be inserted through the straight bore of the T-type union 103 into the hexagonal cavity 105 of the orifice element 101.

In this manner, one orifice element 101 can easily be removed, cleaned and reinserted, or can easily be replaced with another orifice element having, for instance, another orifice diameter. Alternatively, an adjustable orifice may be provided at 101 and may then be adjusted and readjusted with a screwdriver or wrench through the T-type union 103.

This embodiment of the invention thus provides for an easy metering of the secondary fluid or gas flow and for an easy adjustment of such metering to various operating conditions and desiderata.

In this respect, according to Bernoulli's well-known equation applying to fluid flow, there is a specific relationship between velocity and pressure in a flow system. In the case of the venturi, the equation reduces to a requirement that the static pressure change between two points be proportional to the change in the square of the velocity between those points. Conversely, change in velocity is proportional to the square root of the static pressure change.

In the case of the venturi system 33 air flow is forced through the venturi by a blower 32 creating an inlet-to-throat pressure difference proportional to the square of that flow. As indicated above, the zero/negative pressure regulator 94 establishes the supply of secondary fluid or gas 35 essentially at venturi inlet pressure, so the same inlet-to-throat pressure difference is made available to drive gas flow through its metering device 101.

Secondary fluid or gas flow 35 is also subject to that Bernoulli equation, and is thus proportional to the square root of the pressure difference, and conversely, the pressure difference is proportional to the square of the secondary fluid or gas flow.

A change in air flow or in primary fluid flow will create a new inlet-to-throat pressure difference, which will induce a gas flow change in direct proportion to that air or primary fluid flow change. The fuel-to-air or secondary fluid-to-primary fluid ratio remains constant. Proper proportioning of the venturi inlet area 81, the throat area 87 and the gas orifice area 104 provide the desired flow rates and fuel/air ratio. Once the system is set up, energy input can be changed by simply changing the air flow through the venturi, such as by blower speed control 36. Unlike other control approaches, the fuel/air ration or secondary fuel/primary fuel ratio remains essentially constant at all input rates.

The venturi system 33 operates with very little energy loss. The gradual cross-section increase from throat 87 to outlet 89 prevents the large-scale eddies and flow separation typical of nozzles and simple orifices. The saved energy appears in the form of recovered static pressure at the outlet, where it is available to motivate flow through subsequent parts of the system, such as the burner 16 or other fluid utilization apparatus. This allows use of a blower requiring lower power input and having lower cost.

If the venturi system is to be used for combustion systems having a range of energy input ratios (firing rates) or in other apparatus having such requirements, a corresponding range of venturi and or secondary orifice fluid flow areas must be employed. Since in Bernoulli flow the static pressure is proportional to the square of the flow rate, use of a single venturi for a range of input rates imposes an unreasonably large range of static pressure. For example, systems with a 4:1 range of firing rates would involve a pressure range of 16:1. On the other hand, increasing the flow section areas in proportion to the input rate results in the same operating pressures for all venturis. This is because the per-unit flow, or velocity, remains in the same range.

Traditionally, venturis have been designed with round cross-sections, but in the case of venturi system 33 a rectangular cross-section is used. By fixing one dimension of the section and specifying the other in proportion to the energy input rate, a family of venturi system of constant profile can be used for a range of combustion or fluid utilization systems. Rectangular cross-section and constant profile simplify manufacture of the venturi from sheet metal.

Since all venturis in the group are intended to operate with essentially the same fuel/air or secondary fuel/primary fuel ratio, the static pressure required of the blower 32 and the pressures created at various points in the combustion or fluid utilization systems are essentially the same for all models of a series. In addition to the advantage of using low pressure blowers 32, this simplifies procedures for factory adjustment or field service. This in addition to the above mentioned very substantial manufacturing advantages of the non-symmetrical venturi design and construction according to an embodiment of the subject invention.

However it is to be understood that many of the features of the venturi system design herein disclosed are not dependent on the venturi being rectangular or asymmetrical or even of sheet metal. Introduction of gas or secondary fluid downstream or on the positive side of a blower 32, use of a step 88 at the venturi throat 87, and programmed use of the negative pressure regulator setting to control degree of leanness, for example can be done with venturis of circular cross-section made from other than sheet metal. Asymmetry can be accomplished without resorting to sheet metal construction. The combustion chamber 32 may be tilted, horizontal, vertical, or upside-down, as desired while one or more of the other features herein disclosed are employed, and other variations are possible within the scope of the invention.

In fact, the subject extensive disclosure will render apparent or suggest to those skilled in the art various modifications and variations within the spirit and scope of the invention and various combinations of the disclosed inventive aspects.

I claim:

1. In a method of mixing a secondary fluid with a primary fluid, the improvement comprising in combination:
providing for said primary fluid a first flow channel deceasing in a direction of flow of primary fluid;

utilizing dynamic energy of said primary fluid to induce said secondary fluid into said primary fluid;

providing for the primary fluid with induced secondary fluid a second flow channel increasing in a direction of flow of said primary fluid with induced secondary fluid; and arranging corresponding sides of said first and second flow channels along a plane common to said first and second channels.

2. A method as claimed in claim 1, including:

providing a flat piece of material extending in said common plane; and forming said corresponding sides of said first and second flow channels of said flat piece of material.

3. A method as in claim 1, making said first flow channel of rectangular cross-section decreasing in said direction of flow of said primary fluid;

making said second flow channel of rectangular cross-section increasing in said direction of flow of said primary fluid with induced secondary fluid; and arranging corresponding sides of rectangular cross-sections of said first and second fluid channels along said plane common to said first and second channels.

4. A method as in claim 1, including:

providing a flat piece of material extending in said common plane;

forming said first flow channel with the aid of said flat piece of material into a flow channel of rectangular cross-section deceasing in said direction of flow of said primary fluid; and forming said second flow channel with the aid of said flat piece of material into a flow channel of rectangular cross-section increasing in said direction of flow of said primary fluid with induced secondary fluid.

5. A method as in claim 1, wherein:

formation of said first and second flow channels includes:

providing a piece of material of U-shaped cross-section having a flat bight portion and having first and second sides forming, respectively:

corresponding first sides of said first flow channel decreasing in said direction of flow of said primary fluid and of said second flow channel increasing in said direction of flow of said primary fluid with induced secondary fluid; and corresponding opposite second sides of said decreasing first flow channel and of said increasing second flow channel; and closing further sides of said first and second flow channels opposite said flat bight portion.

6. A method as in claim 1, wherein:

said second flow channel is given a smallest cross-section larger than the smallest cross-section of said first flow channel; and said secondary fluid is induced into said primary fluid between said smallest cross-sections of said first and second flow channels.

7. A method as in claim 1, wherein:

said first flow channel is provided with a transverse edge at its smallest cross-section; and said secondary fluid is induced into said primary fluid after said transverse edge in said direction of flow of said primary fluid.

8. A method as in claim 1, wherein:

said secondary fluid is distributed at an end of said first flow channel across said first and second flow channels.

9. A method as in claim 1, including:

tracking said primary fluid in pressure with said secondary fluid at a negative pressure offset relative to a pressure that would produce a substantially constant ratio of secondary fluid to primary fluid.

10. A method as in claim 9, wherein:

said secondary fluid is distributed at an end of said first flow channel across said first and second flow channels.

11. A method as in claim 1, wherein:

said primary fluid is air;

said secondary fluid is combustible gas;

said air is forced into and through said first flow channel;

dynamic energy of said forced air is utilized to induce said gas into said forced air to form an air/gas mixture;

said air/gas mixture proceeds through said second flow channel;

a burner is connected to said second flow channel for combustion of said air/gas mixture.

12. A method as in claim 11, wherein:

a heat exchanger is provided for receiving thermal energy from said combustion.

13. A method as in claim 11, wherein:

said burner is incorporated in a combustion chamber and heat exchanger assembly, with the gas burner being located closer to ground than the heat exchanger which can produce condensate and scale falling toward ground;

said combustion chamber and heat exchanger assembly is tilted relative to ground so that substantially all condensate and scale falling from the heat exchanger misses the gas burner.

14. A method as in claim 13, wherein:

said air/gas mixture is provided with substantially all the air needed for a combustion.

15. A method as in claim 1, wherein:

said plane common to said first and second flow channels is arranged in a vertical direction.

16. In a method of constructing and operating a gas-fired heater having a gas burner, combustion chamber and heat exchanger assembly for heating fluid in the heat exchanger by combustion of an air/gas mixture, with the gas burner located closer to ground than the heat exchanger which can produce condensate and scale falling toward ground, the improvement comprising in combination:

tilting the combustion chamber and heat exchanger assembly relative to ground so that substantially all condensate and scale falling from the heat exchanger misses the gas burner;

providing said air/gas mixture with substantially all the air needed for a combustion; and force-feeding said air/gas mixture with substantially all said air to said gas burner for combustion thereof.

17. A method as in claim 16, wherein:

said combustion chamber and heat exchanger assembly is tilted so that a diagonal through the combustion chamber extends substantially at right angles to ground.

18. A method as in claim 16, wherein:

said combustion chamber and heat exchanger assembly is tilted by substantially forty-five degrees relative to ground.

19. A method as in claim 16, wherein:

said gas burner is formed as a porous burner; and said air/gas mixture with substantially all said air is force-fed to said porous burner for combustion thereat.

20. A method as in claim 16, wherein:

said air/gas mixture with substantially all said air is force-fed to said burner with the aid of a blower.

21. A method as in claim 16, wherein:

said air/gas mixture is prepared by providing a venturi system and by entraining gas into substantially all said air with said venturi system.

22. A method as in claim 21, wherein:

said prepared air/gas mixture is force-fed to said gas burner with a blower.

23. A method as in claim 16, wherein:

substantially all said air is provided by a blower before forming said air/gas mixture; and said air/gas mixture is provided by entraining gas into substantially all said air provided by said blower.

24. A method as in claim 16, including:

providing a venturi system with an air input, an air/gas mixture output, and a gas input between said air input and said air/gas mixture output;

forcing substantially all said air into said air input;

applying gas to said gas input;

entraining the applied gas with said venturi system into the flow of air to provide an air/gas mixture; and supplying said compressed air/gas mixture to said gas burner for said combustion.

25. A method as in claim 24, wherein:

an air blower force-feeds substantially all said air into said air input of the venturi system.

26. In a method of mixing a secondary fluid with a primary fluid, the improvement comprising in combination:

tracking said primary fluid in pressure with said secondary fluid at a negative pressure offset relative to a pressure that would produce a substantially constant ratio of secondary fluid to primary fluid;

metering said secondary fluid; and distributing said metered secondary fluid across a flow of said primary fluid.

27. A method as in claim 26, wherein:

said secondary fluid is distributed through a plurality of apertures into said flow of the primary fluid.

28. A method as in claim 27, wherein:

said secondary fluid is metered through a single orifice and is applied to said primary fluid through said plurality of apertures.

29. In apparatus for mixing a secondary fluid with a primary fluid by utilizing dynamic energy of said primary fluid to induce said secondary fluid into said primary fluid, the improvement comprising in combination:

a first flow channel for said primary fluid deceasing in a direction of flow of primary fluid;

a second flow channel for the primary fluid with induced secondary fluid increasing in a direction of flow of said primary fluid with induced secondary fluid; and an inlet of said secondary fluid to said primary fluid between said first and second flow channels;

corresponding sides of said first and second flow channels lying in a plane common to said first and second channels.

30. Apparatus as claimed in claim 29, wherein:

corresponding sides of said first and second flow channels comprise a flat piece of material extending in said common plane.

31. Apparatus as in claim 29, wherein:

said first flow channel is of rectangular cross-section decreasing in said direction of flow of said primary fluid;

said second flow channel is of rectangular cross-section increasing in said direction of flow of said primary fluid with induced secondary fluid; and corresponding sides of rectangular cross-sections of said first and second fluid channels extend along said plane common to said first and second channels.

32. Apparatus as in claim 29, including:

a flat piece of material extending in said common plane;

said first flow channel including said flat piece of material in a flow channel of rectangular cross-section increasing in said direction of flow of said primary fluid; and said second flow channel including said flat piece of material in a flow channel of rectangular cross-section decreasing in said direction of flow of said primary fluid with induced secondary fluid.

33. Apparatus as in claim 29, including:

a piece of material of U-shaped cross-section having a flat bight portion and having first and second sides included, respectively:

in corresponding first sides of said first flow channel decreasing in said direction of flow of said primary fluid and of said second flow channel increasing in said direction of flow of said primary fluid with induced secondary fluid; and in corresponding opposite second sides of said decreasing first flow channel and of said increasing second flow channel; and a closure of further sides of said first and second flow channels opposite said flat bight portion.

34. Apparatus as in claim 29, wherein:

said first and second flow channels comprise a piece of material of U-shaped cross-section having a bight portion, and a sweep sheet covering said U-shaped cross-section opposite said bight portion.

35. Apparatus as in claim 29, wherein:

said second flow channel has a smallest cross-section larger than the smallest cross-section of said first flow channel; and said apparatus includes an inlet for said secondary fluid into said primary fluid between said smallest cross-sections of said first and second flow channels.

36. Apparatus as in claim 29, wherein:

said first flow channel has a transverse edge at its smallest cross-section; and said apparatus includes an inlet for said secondary fluid into said primary fluid after said transverse edge in said direction of flow of said primary fluid.

37. Apparatus as in claim 29, including:

means for distributing a said secondary fluid at an end of said first flow channel across said first and second flow channels.

38. Apparatus as in claim 29, including:

a secondary fluid distributor plate between and laterally of said first and second flow channels.

39. A method as in claim 38, wherein:

said secondary fluid distributor plate has a plurality apertures.

40. Apparatus as in claim 29, including:

means for tracking said primary fluid in pressure with said secondary fluid at a negative pressure offset relative to a pressure that would produce a substantially constant ratio of secondary fluid to primary fluid.

41. Apparatus as in claim 40, including:

means for distributing said secondary fluid at an end of said first flow channel across said first and second flow channels.

42. Apparatus as in claim 29, wherein:

said primary fluid is air;

said secondary fluid is combustible gas;

said apparatus includes an air-force-feeder issuing into said first flow channel;

said inlet is a combustible gas inlet to force-fed air between said first and second fluid flow channels; and a burner connected to said second flow channel for combustion of an air/gas mixture from said second flow.

43. Apparatus as in claim 42, wherein:

said plane common to said first and second flow channels extends in a vertical direction.

44. Apparatus as in claim 42, including:

a heat exchanger associated with said burner.

45. Apparatus as in claim 44, including:

a combustion chamber and heat exchanger assembly including said burner located closer to ground that the heat exchanger which produces condensate and scale falling toward ground;

said combustion chamber and heat exchanger assembly tilted relative to ground so that substantially all condensate and scale falling from the heat exchanger misses the gas burner.

46. Apparatus as in claim 45, wherein:

said air-force-feeder includes an air blower issuing into said first flow channel and adapted to forcefeed substantially all air needed for combustion of said air/gas mixture at said burner.

47. In a gas-fired heater, the improvement comprising in combination:

a gas burner, combustion chamber and heat exchanger assembly tilted relative to ground so that the gas burner is closer to said ground than said heat exchanger and so that said gas burner is on one side of a plane extending vertically to said ground, and the heat exchanger is on the opposite side of said plane; and an air/gas mixture force-feeder for combustible air/gas mixtures connected to the combustion chamber and having a capacity for supplying to said combustible air/gas mixture for said gas burner substantially all the air needed for combustion without substantial secondary air.

48. A gas-fired heater as in claim 47, wherein:

said combustion chamber and heat exchanger assembly is tilted so that a diagonal through the combustion chamber extends substantially at right angles to ground.

49. A gas-fired heater as in claim 47, wherein:

said combustion chamber and heat exchanger assembly is tilted at substantially forty-five degrees relative to ground.

50. A gas-fired heater as in claim 47, wherein:

said gas burner is a porous burner.

51. A gas-fired heater as in claim 47, wherein:

said air/gas mixture force-feeder includes a blower having a capacity for supplying to said gas burner an air/gas mixture including substantially all said air for combustion.

52. A gas-fired heater as in claim 47, wherein:

said air/gas mixture force-feeder includes a venturi system.

53. A gas-fired heater as in claim 52, wherein:

said air/gas mixture force-feeder includes a blower connected to said venturi system.

54. A gas-fired heater as in claim 47, wherein:

said force-feeder includes a blower adapted to provided substantially all said air for said combustible air/gas mixture, and means for entraining gas into substantially all said air provided by said blower.

55. A gas-fired heater as in claim 47, wherein:

said force-feeder includes a venturi system having an air input for substantially all said air, an air/gas mixture output connected to said gas burner, and a gas input between said air input and said air/gas mixture output.

56. A gas-fired heater as in claim 55, wherein:

said force-feeder includes an air blower connected to said air input of the venturi system and adapted to force-feed substantially all said air into said air input of the venturi system.

57. In apparatus for mixing a secondary fluid with a primary fluid, the improvement comprising in combination:

a zero governor type of secondary fluid regulator having a negative pressure offset;

a secondary fluid metering device connected to said governor; and a secondary fluid distributor connected to said metering device, a primary fluid supply, said zero governor includes means for tracking said primary fluid in pressure with said secondary fluid at a negative pressure offset relative to a pressure that would produce a substantially constant ratio of secondary fluid to primary fluid; and said secondary fluid distributor includes means for distributing metered secondary fluid across a flow of said primary fluid.

58. Apparatus as in claim 57, wherein:

said secondary fluid is distributed through a plurality of apertures into said flow of the primary fluid.

59. A method as in claim 58, wherein:

said secondary fluid is metered through a single orifice and is applied to said primary fluid through said plurality of apertures.

\* \* \* \* \*